United States Patent [19]

Gutweiler et al.

[11] Patent Number: 5,514,752

[45] Date of Patent: May 7, 1996

[54] POLYPROPYLENE MOLDING COMPOSITION HAVING IMPROVED SURFACE PROPERTIES

[75] Inventors: Matthias Gutweiler, Taunusstein; Hans-Jürgen Zimmermann, Weiterstadt, both of Germany

[73] Assignee: Hoechst Aktiengesellschaft, Frankfurt, Germany

[21] Appl. No.: 309,127

[22] Filed: Sep. 20, 1994

[30] Foreign Application Priority Data

Sep. 22, 1993 [DE] Germany .......................... 43 32 114.3

[51] Int. Cl.⁶ .................................................. C08L 29/14
[52] U.S. Cl. .......................... 525/155; 525/154; 525/231; 525/232; 524/504; 524/502; 524/503
[58] Field of Search ...................................... 524/504, 502, 524/503; 525/232, 231, 154, 155

[56] References Cited

U.S. PATENT DOCUMENTS 5,200,122  4/1993  Katoh et al. ............................ 264/22

FOREIGN PATENT DOCUMENTS 0167455  1/1986  European Pat. Off. .
0471079  2/1992  European Pat. Off. .
93/02141  2/1993  WIPO .

*Primary Examiner*—Paul R. Michl
*Assistant Examiner*—John J. Guarriello
*Attorney, Agent, or Firm*—Connolly & Hutz

[57] ABSTRACT

Moldings which have been produced by thermoplastic forming from a polypropylene molding composition which comprises polypropylene or ethylene/propylene copolymers and polyvinyl butyral of the formula

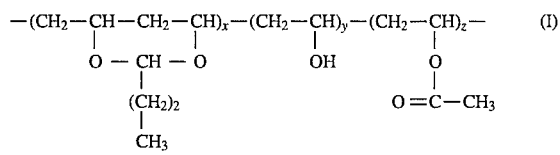

have considerable advantages over moldings of a polypropylene molding composition without PVB, since they have a higher surface tension and can therefore be coated, printed on, written on and laminated without problems without further pretreatment of the surface.

12 Claims, No Drawings

POLYPROPYLENE MOLDING COMPOSITION HAVING IMPROVED SURFACE PROPERTIES

The invention relates to a polypropylene molding composition of good hardness which has an improved capacity for being coated, printed on, written on and laminated and/or a high impact strength even at a low temperature, and comprises an isotactic polymer of propylene or mixtures thereof with a suitable ethylene/propylene rubber, which if desired comprises polyethylene, and polyvinyl butyral.

High-impact polypropylene molding compositions are known in principle. They are prepared by mixing polypropylene and a rubber, such as, for example, ethylene/propylene rubber (EPM) or ethylene/propylene/diene rubber (EPDM), in a melt.

According to the prior art, the polypropylene used comprises atactic polypropylene chains (APP) to the extent of at least 2–10% by weight and isotactic polypropylene chains (IPP) of widely differing chain length ($M_w/M_n$=5 to 10) to the extent of 90–98%.

Alternatively, a polypropylene copolymer which, in addition to APP, polypropylene chains and polymer chains of the comonomer having the build-up described above, also comprises propylene copolymer chains which have different copolymer contents and likewise different chain lengths is also used as the polypropylene component.

Moreover, so-called reactor blends are also known. These are composed of APP, polypropylene and polymers of the comonomer of different chain length, as well as propylene comonomer chains of different chain length and comonomer units. They are prepared in one or more reaction steps directly in the polymerization reactor.

All of these molding compositions have the common feature that the thermoplastic moldings produced from them show only an unsatisfactory adhesion to the most diverse coating compositions. Thus, corresponding moldings cannot be coated, printed on, written on or laminated with a satisfactory result without a preceding surface treatment. The labor- and cost-intensive pretreatment, for example corona discharge, flame treatment, plasma treatment and the like, often prevents the use of polypropylene molding compositions for numerous applications, for reasons of economics.

The object was thus to discover a molding composition which does not have the known adverse properties.

It has now been found that moldings which have been produced from molding compositions which comprise polypropylene or ethylene/propylene copolymers and polyvinyl butyral by thermoplastic forming have a higher surface tension of the molding than in the case of a polypropylene molding composition without PVB, and therefore can be coated, printed on, written on and laminated without problems without further pretreatment of the surface.

The invention thus relates to a polypropylene molding composition comprising 1 to 99% by weight, based on the molding composition, of an isotactic propylene polymer, 0 to 60% by weight, based on the molding composition, of a rubber having a glass transition temperature below −20° C., 0.01 to 99% by weight, based on the molding composition, of a polyvinyl butyral and 0 to 10% by weight, based on the molding composition, of a phase mediator.

The polypropylene to be used for preparation of the polypropylene molding composition according to the invention is either a homopolymer having a melt flow index MFI 230/5 of 1 to 40 g/10 minutes or a copolymer having a melt flow index of 5 to 100 g/10 minutes.

The propylene copolymer comprises propylene units having an isotacticity index of at least 85% to the extent of 99.5 to 50, preferably 99 to 70% by weight, and units of ethylene and/or units of a 1-olefin having at least 4 carbon atoms of the formula $R^1$—CH=CH—$R^2$, in which $R^1$ and $R^2$ are identical or different and are a hydrogen atom or an alkyl radical having 1 to 10, preferably 1 to 6, carbon atoms, or $R^1$ and $R^2$, with the atoms joining them, form a ring having 4 to 22 carbon atoms, to the extent of 0.5 to 50, preferably 1 to 30% by weight. Ethylene and 1-butene, 4-methyl-1-pentene, 1-hexene, 1-pentene and norbornene are preferred. Ethylene is particularly preferred. The comonomer is incorporated randomly with a high regularity.

If the polypropylene polymer comprises a mixture of propylene homopolymer and propylene copolymer, the propylene copolymer comprises units of propylene to the extent of 20 to 90% by weight, preferably 40 to 90% by weight, and units of ethylene and/or at least one 1-olefin as defined above to the extent of 80 to 10% by weight, preferably 60 to 10% by weight. The comonomer is preferably incorporated randomly. The content of propylene homopolymer in the total polypropylene molding composition in this case is I to 99% by weight, preferably 10% by weight, and the content of propylene copolymer is 80 to 1% by weight, preferably 60 to 5% by weight.

The propylene polymer to be used according to the invention, if this comprises two different polymer components, is particularly preferably composed of 40 to 95% by weight of polypropylene (based on the total amount of propylene polymer) having an isotacticity index of at least 85% and 60 to 5% by weight of propylene units and 60 to 10% by weight of ethylene units (in each case based on the total amount of propylene copolymer).

The molding composition according to the invention comprises the isotactic propylene copolymer in an amount of 20 to 99% by weight, preferably 40 to 95% by weight. 0 to 60, preferably 15 to 45% by weight of the molding composition according to the invention is a rubber having a glass transition temperature below −20° C. Suitable rubbers are, for example, styrene/butadiene rubbers, silicone rubbers, ethylene/propylene rubbers (EPM) or ethylene/propylene/diene rubbers (EPDM). EPM and EPDM rubbers can additionally also comprise up to 40% of polyethylene. The composition can comprise 1,4-hexadiene, norbornadiene or cyclopentadiene as the diene component in an amount of up to 10% by weight, based on the total amount of rubber.

The content of ethylene and propylene is not limited, as long as a glass transition temperature of the amorphous component of less than −20° C. is reached.

A typical composition for commercially available EPM rubbers is, for example, 10 to 60% by weight of propylene units and 90 to 40% by weight of ethylene units. Of the ethylene units, 0 to 40% by weight here are attributed to a pure polyethylene content, and the remainder forms the copolymer content together with the propylene.

EPDM rubbers have a corresponding composition, but in addition to propylene and ethylene, 1 to 10% by weight of a diene of the abovementioned type are also additionally incorporated in the copolymer content. The melt viscosity of typical EPM and EPDM rubbers is in the range from 0.5 to 300 g/10 minutes (MFI 230/5).

The Mooney viscosity (measured at 121° C., ML) is 20 to 80. The yield stress at 60% elongation is typically 10 to 300 psi (pounds/square inch, 1 psi=6894.8 kg/m.sec$^2$=1 Pa).

Rubbers which can advantageously be used are on the market, for example, under the trade names Vistalon, Exxelor (Exxon Chemicals), Dutral (Dutral S. A.), Nordel (Du Pont) or Buna (Veba). 0.01 to 99% by weight, preferably 1–30% by weight, particularly preferably 5–15% by weight, of the molding composition according to the invention is a polyvinyl butyral according to formula I

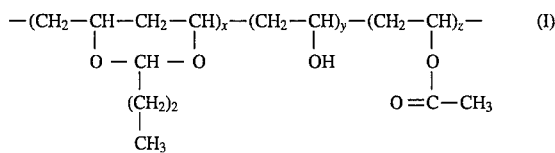

in which the weight ratio of the units $(\ldots)_x:(\ldots)_y:(\ldots)_z$ is in the range from 40 to 90%:5 to 50%:<10%. However, polyvinyl butyral having weight ratios of 60 to 85% of $(\ldots)_x$:10 to 40% $(\ldots)_y$:<5% of $(\ldots)_z$ is preferred.

Polyvinyl butyral as a 10% strength solution in n-butanol has a viscosity, measured by the Höppler method (DIN 53015), of up to 500 mPa.s, and polyvinyl butyral with a viscosity range of 10 to 200 mPa.s is particularly preferred.

0 to 10% by weight of the molding composition according to the invention comprises a suitable phase mediator. Suitable phase mediators are, for example, polypropylenes grafted with maleic anhydride. Phase mediators which can advantageously be used are on the market, for example, under the trade names ®Hostaprime and ®Hostamont (both Hoechst AG) or ®Jeffamine (Texaco Chem. Co.).

In addition to the isotactic propylene polymer, the rubber, the polyvinyl butyral and the phase mediator, the molding composition according to the invention can also comprise the customary additives, for example stabilizers, antioxidants, UV absorbers, light stabilizers, metal deactivators, free-radical scavengers, fillers and reinforcing agents, compatibilizers, plasticizers, lubricants, emulsifiers, pigments, optical brighteners, flameproofing agents, antistatic agents, blowing agents and flow auxiliaries.

The molding composition according to the invention can be prepared by the methods customary for mixing polymers and additives in plastics processing.

One possibility is the use of an extruder having mixing and kneading organs on the screw. Furthermore, headers such as are employed in the vulcanized and non-vulcanized rubber industry are also suitable mixing machines.

The mixing temperature depends on the particular composition of the molding composition and can be determined by simple routine experiments.

The molding composition according to the invention results in moldings which are distinguished by a good ability to be coated (without the customary pretreatment), in combination with a good hardness and impact strength, in particular also at temperatures below 0° C. Generally, this molding composition can be used for the production of extruded, injection-molded, foamed or blow-molded shaped articles in all instances where a high rigidity, hardness, tear and flexural strength, dimensional stability and scratch resistance in combination with a high impact strength, and at the same time partial or complete coating, writing on, printing on or laminating are desirable.

In automobile construction, it can be used, for example, for partly or completely coatable front and rear fenders, external mirrors, radiator grilles, side guard strips, spoilers, seals, mudguard linings, lorry and tractor mudguards, scratch-resistant interior fittings for motor vehicles, or hub caps.

In addition, the molding composition according to the invention is also suitable, for example, for the production of tear-resistant films, membrane filters, fibers and filaments which can be written on, laminated or printed on.

The following examples are intended to illustrate the invention in more detail.

MFI 230/2.16=melt flow index at 230° C., 2.16 kg load, according to DIN 53735

E modulus=tensile modulus according to ISO R 527, measured on the large standard tensile bar (170×10× 4 mm, flow length 80 mm)

The yield stress and the elongation at yield stress were determined.

The penetration energy was also measured in the electronic penetration test according to ISO 6603/2.

$a_{cN}$=Charpy notched impact strength according to ISO 179, measured on injection-molded Izod bars (80×10×4 mm) with a V notch (flank angle 45°, notch depth 1.3 mm, notch radius 1 mm).

The surface tension of the surface of injection-molded sheets was determined with the aid of commercially obtainable test inks (Arcopal) and by the method of the sitting drop using various liquids.

The sheets were coated with a water-based primer without further pretreatment, and then coated with a water-based top coating.

A crosshatch test was carried out.

To produce the molding compositions, a dry powder mixer from Henschel and a ZSK 28 twin-screw extruder (Werner & Pfleiderer) were used.

EXAMPLE 1

A molding composition comprising 89% by weight of isotactic polypropylene, based on the total molding composition, and 10% by weight of a polyvinyl butyral comprising 84.8% by weight of vinyl acetal units (x), 12.3% by weight of vinyl alcohol units (y) and 2.9% by weight of vinyl acetate units (z) was prepared by extrusion. The viscosity according to Höppler (DIN 53015) of a 10% strength solution in n-butanol was 125 mPa.s. The DSC glass transition temperature was 70° C. The isotactic polypropylene used had an MFI 230/2.16 of 5 g/10 minutes and a melting point of 161° C.; other data were $M_w$=300,000 g/mol, $M_w/M_n$=4.5, VN=230 cm$^3$/g.

4500 g of the isotactic polypropylene powder were mixed with 500 g of the PVB and the mixture was stabilized against chemical degradation under extrusion conditions with 5 g of pentaerithrityl tetrakis[3-(3,5-di-t-butyl- 4-hydroxyphenyl-)propionate], 2.5 g of tris-( 2,4-di-t-butylphenyl)phosphite and 5 g of calcium stearate. Temperatures of 170° C. (intake), 190° C., 210° C., 230° C. and 230° C. (die plate) were set in the five heating zones of the extruder. The extruder screw was operated at 200 rpm and the melt temperature of the mixture in the extruder was 240° C.

The following data were measured on the molding composition thus prepared: MFI 230/2.16=5.74 g/10 minutes; VN=168 cm$^3$/g; $a_{cN}$=3.1 mJ/mm$^2$ (23° C.); melting point (DSC)=161° C., glass transition temperature Tg=10° C.

The surface tension of injection-molded sheets was now 33 mN/m, instead of 20 mN/m for the pure polypropylene.

EXAMPLE 2

Example 1 was repeated, but instead of 4500 g of isotactic polypropylene, only 4450 g were employed, and 50 g of the phase mediator, a maleic anhydride grafted onto short-chain polypropylene, were additionally employed.

The following data were measured on the molding composition thus prepared: MFI 230/2.16=5.11 g/10 minutes; $a_{cN}$=3.1 mJ/mm$^2$ (23° C.); melting point (DSC)=161° C., glass transition temperature Tg=10° C.

The surface tension of injection-molded sheets was 35 mN/m, instead of 20 mN/m for the pure polypropylene.

EXAMPLE 3

Under the same conditions as in Example 2, instead of the phase mediator used there, 50 g of a maleic anhydride grafted onto polypropylene of medium chain length were employed.

The test results are summarized in the Table.

EXAMPLES 4 TO 6

The procedure was analogous to Examples 1–3, but instead of the propylene homopolymer, a propylene block copolymer was used here. This propylene block copolymer had the following composition: 75% by weight of propylene units and 25% by weight of ethylene units; 30% by weight of the rubber phase was polyethylene and 70% by weight was an ethylene/propylene copolymer (EPM) comprising 60% by weight of propylene units and 40% by weight of ethylene units. The MFI 230/5 of the rubber was 2 g/10 minutes, the viscosity number (VN) was 236 cm$_3$/g, the DSC melting point was 161° C. and the DSC glass transition temperature was –56° C.

EXAMPLES 7 TO 9

The procedure was analogous to Examples 4 to 6, and instead of the pure block copolymer, only 90 parts thereof and additionally 10 parts of a rubber formulation were used here. This rubber formulation had the following composition: 35.8% by weight of propylene units and 64.2% by weight of ethylene units; 40.4% by weight of the rubber phase was polyethylene and 59.6% by weight was an ethylene/propylene copolymer (EPM) comprising 60.0% by weight of propylene units and 40.0% by weight of ethylene units. The MFI 230/5 of the rubber formulation was 2 g/10 minutes, the viscosity number (VN) was 236 cm$^3$/g, the DSC melting point was 131° C. and the DSC glass transition temperature was –56° C.

The results of testing are summarized in the Table.

EXAMPLE 10

Under the same conditions as in Example 2, instead of the 1% of phase mediator used there, 5% by weight was employed here.

The results of testing are summarized in the Table.

EXAMPLE 11

Under the same conditions as in Example 5, instead of the polyvinyl butyral used there, another PVB type having the following composition was used: 71.9% by weight of vinyl acetal units (x), 25.3% by weight of vinyl alcohol units (y) and 2.8% by weight of vinyl acetate units (z). The viscosity according to Höppler (DIN 53015) of a 10% strength solution in n-butanol was 125 mPa.s. The DSC glass transition temperature was 73° C.

The surface tension measured on a molding produced from this molding composition was now 39 mN/m, instead of 20 mN/m for the pure propylene block copolymer.

Comparison Example A

For comparison, the pure propylene homopolymer from Example 1 was investigated.

Comparison Example B

For comparison, the pure propylene block copolymer from Example 4 was investigated.

The results are summarized in Table 1.

The phase contrast and the melt show the quality of the dispersion. The influence of the phase mediator can be clearly seen. The mixture of the propylene homopolymer with PVB without a phase mediator still has a particle size of 10 μm, while under the influence of the phase mediator the average particle size has fallen at least to 2 μm. An amount of 1% by weight was completely sufficient here. The amount of 5% of the phase mediator added experimentally in Example 10 produced no further refinement in morphology.

TABLE

| | | | | | Properties of the molding composition | | | | | | | | |
|---|---|---|---|---|---|---|---|---|---|---|---|---|---|
| Ex. | MFI 230/ 2.16 g/10 min | E modulus [MPa] | Yield stress [MPa] | Elongation [%] | $^a$cN mJ/mm$^2$ 23° C. | 0° C. | –20° C. | –40° C. | Penetration energy W[J] 0° C. | –20° C. | –40° C. | Surface tension mN/m | Crosshatch Gt |
| 1 | 5.74 | — | — | — | 3.4 | — | — | — | — | — | — | 33 | — |
| 2 | 5.11 | — | — | — | 3.1 | — | — | — | — | — | — | 35 | — |
| 3 | 6.31 | — | — | — | 2.1 | — | — | — | — | — | — | 34 | — |
| 4 | 7.95 | 927 | 13.2 | 71 | 15.6 | 8.5 | 6.8 | 4.4 | 18.9 | 19.7 | 14.4 | 36 | — |
| 5 | 9.53 | — | — | — | 52.7 | — | — | — | — | — | — | 35 | — |
| 6 | 8.41 | — | — | — | 57.8 | — | — | — | — | — | — | 35 | — |
| 7 | 6.77 | 811 | 11.6 | 43 | 35.2 | 12.2 | 9.0 | 5.6 | 18.5 | 17.9 | 17.5 | 35 | — |
| 8 | 6.98 | — | — | — | 65.6 | — | — | — | — | — | — | 35 | — |
| 9 | 6.92 | — | — | — | 68.1 | — | — | — | — | — | — | 35 | — |
| 10 | 4.40 | — | — | — | 33.6 | — | — | — | — | — | — | 29 | — |
| 11 | 6.50 | 964 | 13.1 | 49 | — | — | — | — | — | — | — | 39 | 1 |
| A | 5.00 | 1350 | 31 | 10 | — | — | — | — | — | — | — | 29 | 5 |
| B | 6.50 | 694 | 12 | 84 | 50 | 10 | 8.5 | 5.5 | 23.7 | 25.4 | 24.6 | 29 | 5 |

We claim:

1. A polypropylene molding composition comprising 1 to 99% by weight, based on the molding composition, of an isotactic propylene polymer, 0 to 60% by weight, based on the molding composition, of a rubber having a glass transition temperature below –20° C., 0.01 to 99% by weight, based on the molding composition, of a polyvinyl butyral and 0 to 10% by weight, based on the molding composition, of a phase mediator.

2. A molding composition as claimed in claim 1, wherein the isotactic propylene polymer is a propylene homopolymer having an isotacticity index of at least 85%.

3. A molding composition as claimed in claim 1, wherein the isotactic propylene polymer is a propylene copolymer which comprises propylene units having an isotacticity index of at least 85% to the extent of 99.5 to 50% by weight and units of ethylene and/or units of a 1-olefin having at least 4 carbon atoms of the formula $R^1$—CH=CH—$R^2$, in which $R^1$ and $R^2$ are identical or different and are a hydrogen atom or an alkyl radical having 1 to 10 carbon atoms, or $R^1$ and $R^2$, with the atoms joining them, form a ring having 4 to 22 carbon atoms, to the extent of 0.5 to 50% by weight.

4. A molding composition as claimed in claim 3, wherein the propylene copolymer is an ethylene/propylene copolymer.

5. A molding composition as claimed in claim 1, wherein the isotactic propylene polymer is a mixture of a) 20 to 99% by weight of a propylene homopolymer having an isotacticity index of at least 85% and b) 80 to 1% by weight of a propylene copolymer which comprises propylene units having an isotacticity index of at least 85% to the extent of 20 to 90% by weight and units of ethylene and/or units of a 1-olefin having at least 4 carbon atoms of the formula $R^1$—CH=CH—$R^2$, in which $R^1$ and $R^2$ are identical or different and are a hydrogen atom or an alkyl radical having 1 to 10 carbon atoms, or $R^1$ and $R^2$, with the atoms joining them, form a ring having 4 to 22 carbon atoms to the extent of 80 to 10% by weight.

6. A molding composition as claimed in claim 1, which comprises polyvinyl butyral of the formula I

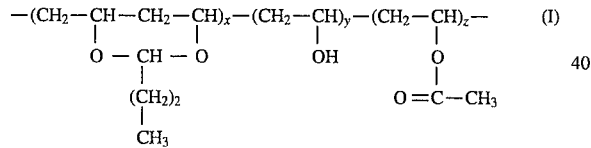

in which the weight ratio of the units $(\ldots)_x:(\ldots)_y:(\ldots)_z$ is in the range from 0 to 90%:5 to 50%:<10%.

7. A molding composition as claimed in claim 1, wherein the phase mediator is a polypropylene grafted with maleic anhydride.

8. A molding composition as claimed in claim 1, which additionally comprises stabilizers, antioxidants, UV absorbers, light stabilizers, metal deactivators, free-radical scavengers, fillers and reinforcing agents, compatibilizers, plasticizers, lubricants, emulsifiers, pigments, optical brighteners, flameproofing agents, antistatic agents, blowing agents or flow auxiliaries.

9. A shaped article produced from a molding composition as claimed in claim 6, having a surface tension from 33 to 39 mN/m.

10. A process for producing shaped articles having a surface tension from 33 to 39 mN/m, which process comprises the steps of: providing a molding composition as claimed in claim 6, and forming said molding composition into a shaped article.

11. A process for the production of shaped articles which have high surface tension, comprising the steps of:

making a molding composition by admixing 1–99% by weight of isotactic propylene polymer, 0.01 to 99% by weight polyvinyl butyral, 0 to 60% by weight of a rubber having a glass transition temperature of less than −20° C., and 0–10% by weight of a phase mediator, each based on the molding composition, and forming said molding composition into a shaped article, whereby the shaped article thus formed has a surface tension of from about 33 to about 39 mN/m.

12. A shaped article having high surface tension, which article is formed from a molding composition comprising:

1–99% by weight of isotactic propylene polymer, 0.01 to 99% by weight polyvinyl butyral, 0 to 60% by weight of a rubber having a glass transition temperature of less than −20° C., and 0–10% by weight of a phase mediator, each based on the molding composition, the shaped article thus formed further having a surface tension of from about 33 to about 39 mN/m.

* * * * *